(12) United States Patent
Edwards et al.

(10) Patent No.: US 9,801,475 B2
(45) Date of Patent: Oct. 31, 2017

(54) HIGH-VELOCITY SCANNED ITEM DISTRIBUTION METHOD AND APPARATUS

(71) Applicants: Thomas V. Edwards, Suwanee, GA (US); John C. Allard, Hobe Sound, FL (US); Gregory Scott Egan, Flowery Branch, GA (US); Mark Christopher Johnson, Lawrenceville, GA (US); Levino Felix Perrucci, Lawrenceville, GA (US); John Spencer Tyndall, Atlanta, GA (US); William Brian Whiteside, Ball Ground, GA (US)

(72) Inventors: Thomas V. Edwards, Suwanee, GA (US); John C. Allard, Hobe Sound, FL (US); Gregory Scott Egan, Flowery Branch, GA (US); Mark Christopher Johnson, Lawrenceville, GA (US); Levino Felix Perrucci, Lawrenceville, GA (US); John Spencer Tyndall, Atlanta, GA (US); William Brian Whiteside, Ball Ground, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/874,097

(22) Filed: Apr. 30, 2013

(65) Prior Publication Data
US 2014/0324613 A1 Oct. 30, 2014

(51) Int. Cl.
*A47F 9/04* (2006.01)
*G06Q 20/20* (2012.01)
*G07G 1/00* (2006.01)

(52) U.S. Cl.
CPC ............ *A47F 9/04* (2013.01); *G06Q 20/208* (2013.01); *G07G 1/0018* (2013.01); *G07G 1/0036* (2013.01)

(58) Field of Classification Search
CPC ............... G06F 3/002; G06F 17/30876; G06F 17/30722; G06Q 20/12; G06K 7/10871
USPC .... 705/23, 16, 21, 28, 27; 340/572.1, 572.8; 235/375, 383
See application file for complete search history.

(56) References Cited

U.S. PATENT DOCUMENTS

| | | | | |
|---|---|---|---|---|
| 3,968,626 A * | 7/1976 | Hobbs | | 53/267 |
| 5,048,695 A * | 9/1991 | Fuller et al. | | 209/552 |
| 6,694,356 B1 * | 2/2004 | Philyaw | | 709/217 |
| 7,034,679 B2 * | 4/2006 | Flynn | | G06Q 20/208 340/540 |
| 7,036,726 B1 * | 5/2006 | Edwards | | A47F 9/047 235/383 |
| 7,602,288 B2 * | 10/2009 | Broussard | | 340/572.1 |
| 7,720,711 B2 * | 5/2010 | Taylor | | G06Q 20/20 705/16 |
| 2002/0007281 A1 * | 1/2002 | Gil et al. | | 705/1 |
| 2009/0219153 A1 * | 9/2009 | Ohkawa et al. | | 340/540 |

(Continued)

*Primary Examiner* — Vanel Frenel
(74) *Attorney, Agent, or Firm* — Harden E. Stevens, III; Schwegman, Lundberg & Woessner (57) ABSTRACT

A high-velocity scanned item distribution apparatus and method are presented. The high-velocity scanned item distribution apparatus permits bagging operations for multiple purchase transactions to occur in parallel. Overlapping the bagging operation of multiple purchase transactions allows the scanning and payment operations of the purchase transactions to continue at higher speeds. In addition, point of sale terminals with high-velocity item scanners are allowed to function at higher speeds.

19 Claims, 6 Drawing Sheets

(56) References Cited

U.S. PATENT DOCUMENTS

| | | | |
|---|---|---|---|
| 2009/0265038 A1* | 10/2009 | Ramsey et al. | 700/279 |
| 2011/0046778 A1* | 2/2011 | Pinney et al. | 700/236 |
| 2015/0194023 A1* | 7/2015 | Brackenridge | G06Q 30/06 235/380 |

* cited by examiner

HIGH-VELOCITY SCANNED ITEM DISTRIBUTION METHOD AND APPARATUS

FIELD OF THE INVENTION

The present invention relates to devices for scanning items and more specifically to devices for high-velocity item scanning and for the distribution of the scanned item.

BACKGROUND

Any discussion of prior art throughout the specification should in no way be considered as an admission that such prior art is widely known or forms part of common general knowledge in the field.

Point of sale terminals are used to identify items presented to the terminal for purchase as part of a purchase transaction. Typically, items are picked up by an operator and passed by an item scanning device that identifies each item by reading an optical code attached to or printed on the item. The time required to perform this type of purchase transaction is determined by the skill of the operator and the amount of time required to pickup and move each item past the item scanning device. Retailers with large, high volume stores, require a large number of point of sale terminals to be able to handle the volume of purchase transactions experienced at peek demand times. Point of sale terminals are expensive and require dedicated floor space large enough to accommodate the point of sale terminal and the area used to operate it including an area for a customer and for an operator if it is an assisted terminal.

One method to reduce the total number of point of sale terminals required by a store is to reduce the time required to identify each item of a purchase transaction. However at some point, reducing the time to identify each item fails to produce a reduction in the total time required to perform a purchase transaction because the items must still be delivered to a bagging area and bagged before the purchase transaction is complete and the next purchase transaction can begin. During at least a portion of the bagging time, the item scanning and payment components of the point of sale terminal are idle.

SUMMARY

Among its several aspects, the present invention seeks to overcome or ameliorate at least one of the disadvantages of the prior art, or to provide a useful alternative.

In accordance with the teachings of the present invention, a high-velocity scanned item distribution apparatus and method are provided for distributing items that belong to multiple purchase transactions. The high-velocity scanned item distribution apparatus distributes items from each purchase transaction being processed to the same collection area where the items are available for bagging either by an attendant or a customer or both.

Among its several aspects, the present invention recognizes there is an advantage to being able to rapidly distribute items from multiple purchase transactions to separate collection areas. As long as a collection area is available to receive items, the high-velocity scanned item distribution apparatus can continuously receive items. This permits a high-velocity point of sale terminal to continuously process purchase transactions without having to wait for the items of the purchase transaction to be bagged before continuing to the next purchase transaction.

Among its several aspects, the present invention recognizes there is an advantage to using a high-velocity scanned item distribution apparatus to receive items from a high-velocity point of sale terminal because it improves the performance of the high-velocity point of sale terminal. The improved performance reduces the number of point of sale terminals that are required to handle peek demand periods. The combination can lead to the reduction of two point of sale terminals for each combination of a high-velocity point of sale terminal with a high-velocity scanned item distribution apparatus.

Among its several aspects, the present invention recognizes there is an advantage to being able to reduce the floor space reserved in a store for point of sale terminals and the customer checkout process. The floor space not needed for the point of sale terminals can be used to generate revenue for the store.

Among its several aspects, the present invention recognizes there is an advantage to improving the number of purchase transactions that can be performed over a period of time which also reduces the number of point of sale terminals and operators.

In accordance with an embodiment of the present invention, there is provided a high-velocity scanned item distribution apparatus that receives items scanned by a point of sale terminal and distributes them to multiple collection areas. The apparatus comprising: a distribution area with the shape of a circular disk rotatably mounted in the center of the apparatus forming a top center surface of the apparatus; a collection area fixably mounted to the apparatus extending circularly outward from the edge of the distribution area for approximately three fourths of the circumference of the distribution area and forming a top outer surface of the apparatus; a plurality of area divider arms mounted to the collection area that extend radially between the inner and outer edges of the collection area and divide the collection area into a plurality of individual collection areas; a plurality of arc shaped extendable item fences where one of the plurality of arc shaped extendable item fences is located between the inner edge of each of the plurality of individual collection areas and the outer edge of the distribution area; and wherein the distribution area is configured to receive an item from the point of sale terminal and rotatably move the item to a location above a first of the plurality of individual collection areas wherein the item will exit the distribution area sliding on to the first of the plurality of individual collection areas when a first of the plurality of arc shaped extendible item fences located proximate to the inner edge of the first of the plurality of individual collection areas is in a lowered position.

In accordance with another embodiment of the present invention, there is provided a method implemented by a computer processor controlling a high-velocity scanned item distribution apparatus that receives scanned items from a point of sale terminal that comprise a purchase transaction. The method comprising: receiving information from the point of sale terminal wherein the information indicates the start of the purchase transaction; assigning a first individual collection area from a plurality of individual collection areas to receive items for the purchase transaction after determining no items are present in the first individual collection area; lowering to a lowered position a first item fence from a plurality of item fences wherein the first item fence when in the lowered position only allows items to enter the first individual collection area; extending to an extended position a first extendable element located within a second area divider arm for the first individual collection area wherein the first extendable element when extended directs items into the first individual collection area; causing a distribution area to spin up to a predetermined rotating speed; receiving information from the point of sale terminal about each item of the purchase transaction received by the distribution area from the point of sale terminal; receiving information from the point of sale terminal wherein the information indicates the last item of the purchase transaction has been received by the distribution area; and raising the first item fence to a raised position after determining the last item has been delivered to the first individual collection area.

A more complete understanding of the present invention, as well as further features and advantages of the invention, will be apparent from the following Detailed Description and the accompanying Drawings.

BRIEF DESCRIPTION OF THE DRAWINGS

The present invention may take form in various components and arrangement of components and in various methods. The drawings are only for purposes of illustrating example embodiments and alternatives and are not to be construed as limiting the invention. The drawings are not necessarily drawn to scale. Throughout the drawings, like element numbers are used to describe the same parts throughout the various drawings, figures and charts.

DETAILED DESCRIPTION

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

Figure 1:
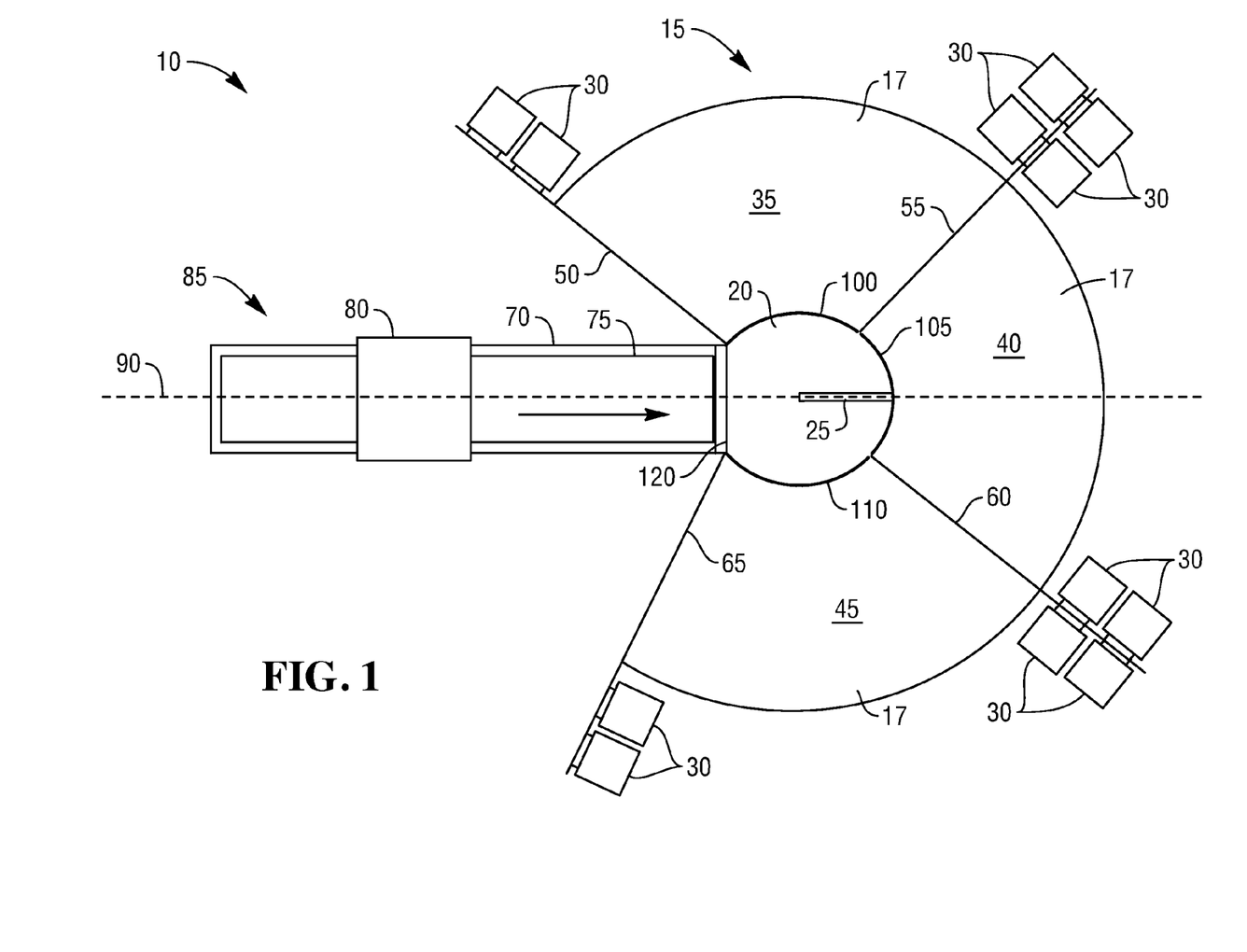
FIG. 1 is a high-level drawing illustrating a high-velocity scanned item distribution system.

With reference to FIG. 1, there is provided a high-level drawing illustrating a high-velocity scanned item distribution system 10. The high-velocity scanned item distribution system 10 includes a high-velocity point of sale (POS) terminal 85 and a high-velocity scanned item distribution apparatus 15. The POS terminal 85 includes a high-velocity optical code scanning device 80, a conveyor housing 70 that houses a conveyor belt 75. The POS terminal 85 includes other components not shown such as a computer for controlling the operation of the POS terminal 85 and terminal for communicating with an operator. The high-velocity optical code scanning device 80 may suitably use multiple optical code scanners and other devices to identify items being presented for scanning and identification. An example of a high-velocity optical code scanning device 80 is provided by U.S. patent application Ser. No. 13/790,001, filed on Mar. 8, 2013, titled "Methods and Apparatus for Fast Item Identification", having the same assignee as this application and which is hereby incorporated by reference in its entirety.

The high-velocity scanned item distribution apparatus (item distribution apparatus) 15 includes a collection area 17, a distribution area 20, a diverter arm 25, three item fences 100, 105, 110 and bagging stations 30. The collection area 17 is stationary and divided into three individual collection areas 35, 40, 45. Items from a single purchase transaction conducted by the POS terminal 85 are distributed to one of the three individual collection areas 35, 40, 45 where the items are temporarily stored. Once a customer completes the purchase of the items, the customer is directed to the collection area where the customer's items have been temporarily stored to begin bagging the items. The collection area 17 is divided into the three individual collection areas 35, 40, 45 using two area divider arms 55, 60 ("divider arms"). In some embodiments, the two divider arms 55, 60 are movable from side to side to change the size of the three individual collection areas 35, 40, 45. There are also two fixed area divider arms 50, 65 ("fixed divider arms"). A fixed divider arm is located at each end of the collection area 17. The two fixed divider arms 50, 65 prevent items from falling off the ends of the collection area 17.

Figure 3:
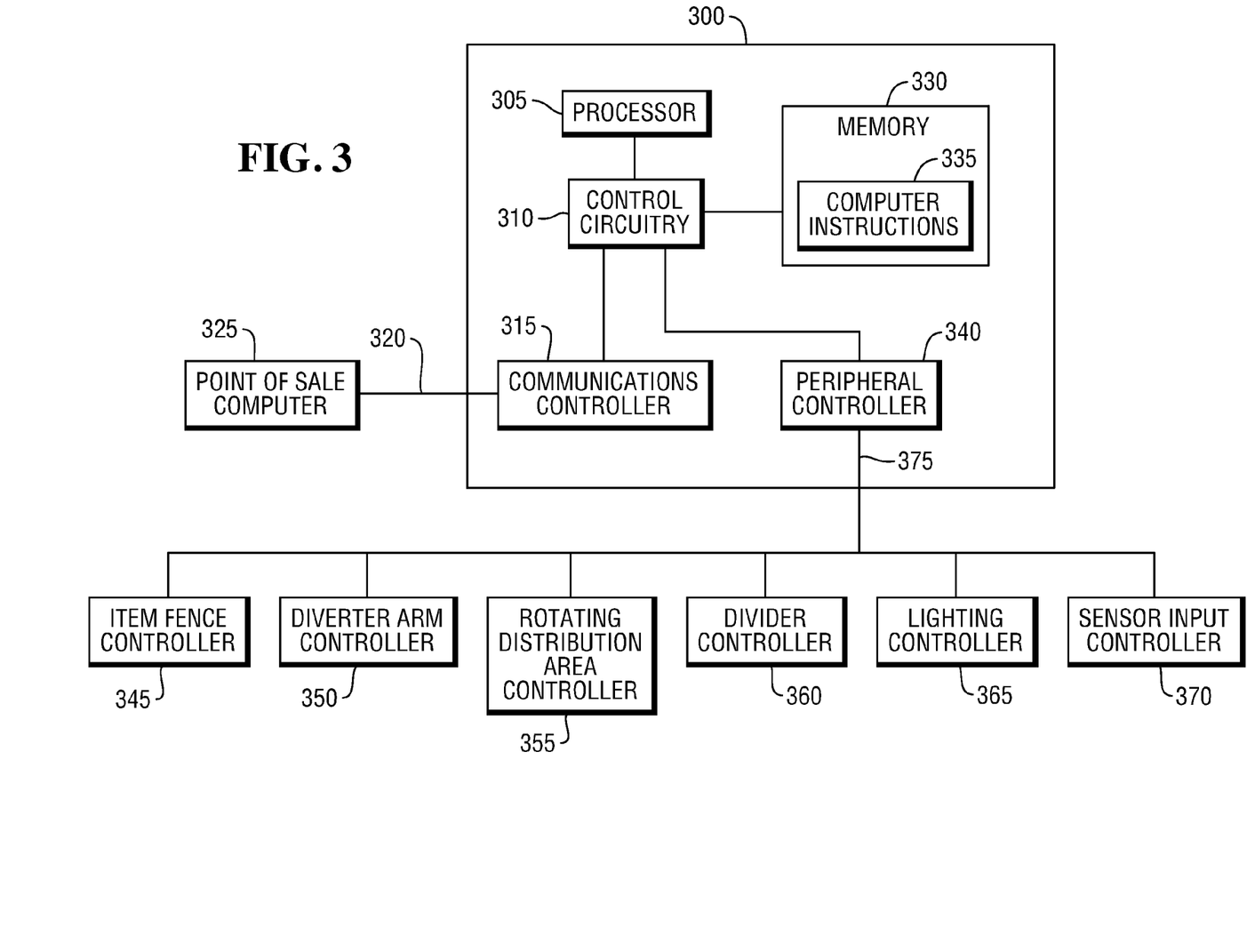
FIG. 3 is a high-level block diagram illustrating selected computer hardware and software components of the high-velocity scanned item distribution system.

In some embodiments, the two divider arms 55, 60 and the two fixed divider arms 50, 65 include an extendable element. The extendable element of each divider arm 50, 55, 60, 65 can be independently extended and retracted on command from the processor 305 (FIG. 3). The extendable element extends from the inner or inside end of each of the divider arms 50, 55, 60, 65. This is the end next to the distribution area 20. When the extendable element is in its full extended position, the extendable element extends to the center of the distribution area 20 and causes items on the distribution area 20 to exit the distribution area 20 when they contact the extendable element. When the extendable element is in the retracted position, as depicted in the FIG. 1, items on the distribution area 20 pass by the divider arm.

In some embodiments, each extendable element is shaped like a bar and when located in the retracted position, each extendable element is substantially housed inside one of the divider arms 50, 55, 60, 65. In other embodiments, each extendable element is rod shaped and when located in the retracted position, each extendable element is substantially housed inside one of the divider arms 50, 55, 60, 65. A person of ordinary skill will understand that the extendable element can be in other shapes as long as the extendable element fixes within the divider arm and can be extended over the surface of the distribution area 20 such that items located on the surface of the distribution area 20 will not pass underneath the extendable element or around the end of the extendable element.

The distribution area 20 is a rotatable cone shaped disk turntable located in the middle of the item distribution apparatus 15. The distribution area 20 receives items from the conveyor belt 75. These items have been scanned and identified by the POS terminal 85 and need to be transferred to one of the three individual collection areas 35, 40, 45 for bagging. As each item exits the end of the conveyor belt 75, it lands on the distribution area 20. The distribution area 20 is rotating and when an item is deposited on the distribution area 20 the item begins to rotate around the item distribution apparatus 15. The distribution area 20 rotates in a counter-clockwise direction but in other embodiments it rotates in a clockwise direction.

Prior to, or as each item reaches the item distribution apparatus 15, the POS terminal 85 communicates information to the item distribution apparatus 15 that indicates the pending arrival of the item. The information also includes information identifying a purchase transaction associated with the item and information describing one or more characteristics of the item, such as heavy, light, fragile, or non-fragile. The item distribution apparatus 15 assigns all items for a purchase transaction to one of the three individual collection areas 35, 40, 45.

Three curved item fences 100, 105, 110 are located between the outer edge of the distribution area 20 and inner edges of the three collection areas 35, 40, 45. One of the item fences is located at the inner edge of each of the three collection areas 35, 40, 45. The three item fences 100, 105, 110 are vertically movable between a raised and lowered position. In the raised position, each of the item fences 100, 105, 110 block items from exiting the distribution area 20. In the lowered position, the top of each of the item fences 100, 105, 110 is level with the surface of the collection area which allows items to slide over them into the respected collection area. Each of the item fences 100, 105, 110 is independently controlled.

In some embodiments, the item distribution apparatus 15 uses the rotation speed of the distribution area 20 in combination with the item fences 100, 105, 110 to cause items to exit the distribution area 20 into the proper individual collection areas 35, 40, 45. In other embodiments, the item distribution apparatus 15 uses the diverter arm 25 in combination with the item fences 100, 105, 110 to direct items to the proper individual collection areas 35, 40, 45.

Embodiments that use the diverter arm 25 may suitably function as follows. After receiving information about the item, the item distribution apparatus 15 positions the diverter arm 25 to a position that will block the item from continuing to rotate around the distribution area 20 and causes the item to exit the distribution area 20 and move into one of the collection areas 35, 40, 45. The item fence for the target individual collection area is in the lowered position while the other two item fences are in the raised position. The position of the diverter arm 25 and the actual exit point from the distribution area 20 is determined by the item distribution apparatus 15 based on the characteristics of the item. Heavy items are directed to one side of the targeted individual collection area and fragile items are directed to a different side of the same individual collection area. In some embodiments, the diverter arm 25 is curved to reduce the initial contact force experienced by an item when it contacts the diverter arm 25 and begins to change its direction of movement.

Figure 2A:
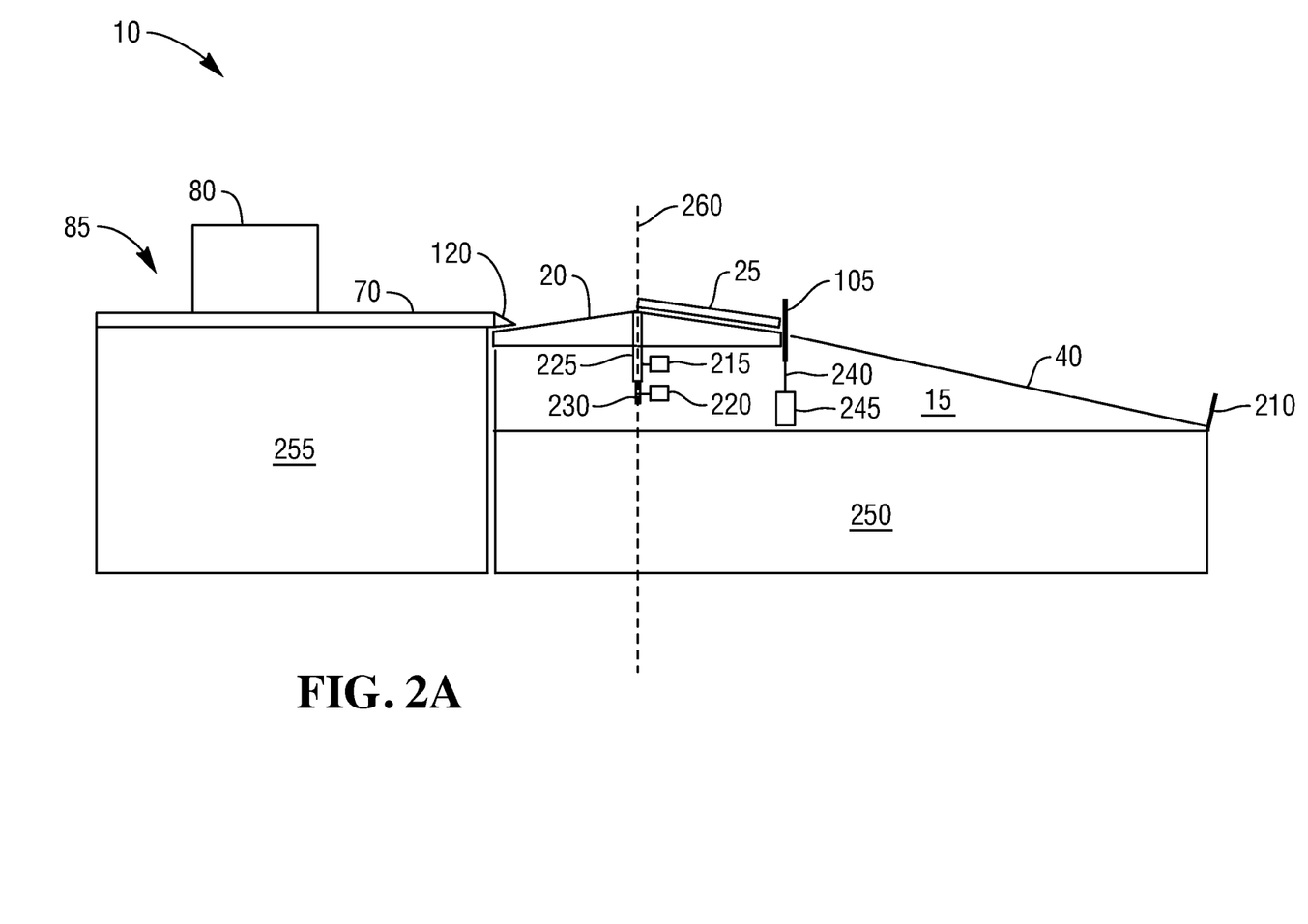
FIG. 2A is a high-level cross section drawing illustrating the item distribution apparatus depicted in FIG. 1.

Turning to FIG. 2A, there is provided a high-level cross section drawing illustrating the item distribution apparatus 15 cut at line 85 depicted in FIG. 1. The item distribution apparatus 15 includes a housing 250 that supports the other components of the item distribution apparatus 15. At the outer edge of the item collection area 17 is a bumper 210 that prevents items from falling off the item distribution apparatus 15. The bumper 210 extends around the entire item collection area 17.

The diverter arm 25 is attached to a first shaft 230 that extends into the center of the item distribution apparatus 15 and connects to a first motor 220 that controls the rotation and position of the diverter arm 25. The first motor 220 is a stepper motor that allows precise control of the location of the diverter arm 25 and can change the speed at which the diverter arm 25 moves. The first shaft 230 is rotatably mounted to the item distribution apparatus 15. The first shaft 230 additionally provides support for the diverter arm 25. As discussed in more detail below, not all embodiments include the diverter arm 25, the first motor 220 and the first shaft 230.

The distribution area 20 is attached to a second shaft 225 that is rotatably mounted to the item distribution apparatus 15. The second shaft 225 provides the rotational forces to rotate the distribution area 20. A second motor 215 is connected to the second shaft 225 and controls the rotation of the distribution area 20 by controlling the rotation of the second shaft 225. The second motor 220 is a stepper motor that allows precise speed control including stopping and reversing the rotation direction of the distribution area 20. In some embodiments, the first shaft 230 is mounted inside the second shaft 225. In some embodiments, the second motor 220 includes a wheel rotated by the second motor 220 where the wheel makes contact with the underside of the distribution area 20 and transfers a rotational force to the distribution area 20 causing it to rotate.

In this embodiment, the three curved item fences 100, 105, 110 are raised and lowered using a linear actuator. In this figure, a cross section of a portion of the item fence 105 is depicted. Item fence 105 is raised and lowered using a linear actuator 245 which is connected to the item fence 105 using a rod 240. The other two item fences 100, 110 have similar components. As shown here, the item fence 105 is in the raised position which blocks items on the distribution area 20 from exiting the distribution area 20 for the length of the item fence 105. When any one of the item fences 100, 105, 110 is located in the lowered position, items on the distribution area 20 will freely slide over the item fence into the desired individual collection area adjacent to the lowered item fence. In other embodiments, different methods are used to raise and lower the item fences 100, 105, 110.

The POS terminal 85 includes a housing 255 that supports the components of the POS terminal 85. Attached to the end of the conveyor housing 70 is a transition component 120 that allows items to slide gently onto the surface of the distribution area 20. The transition component 120 is angled so that items do not fall from the top of the conveyor housing 70 to the surface of the distribution area 20 but instead slide most of the distance. This reduces the possibility of damaging items being delivered to the distribution area 20 from the POS terminal 85.

Figure 2B:
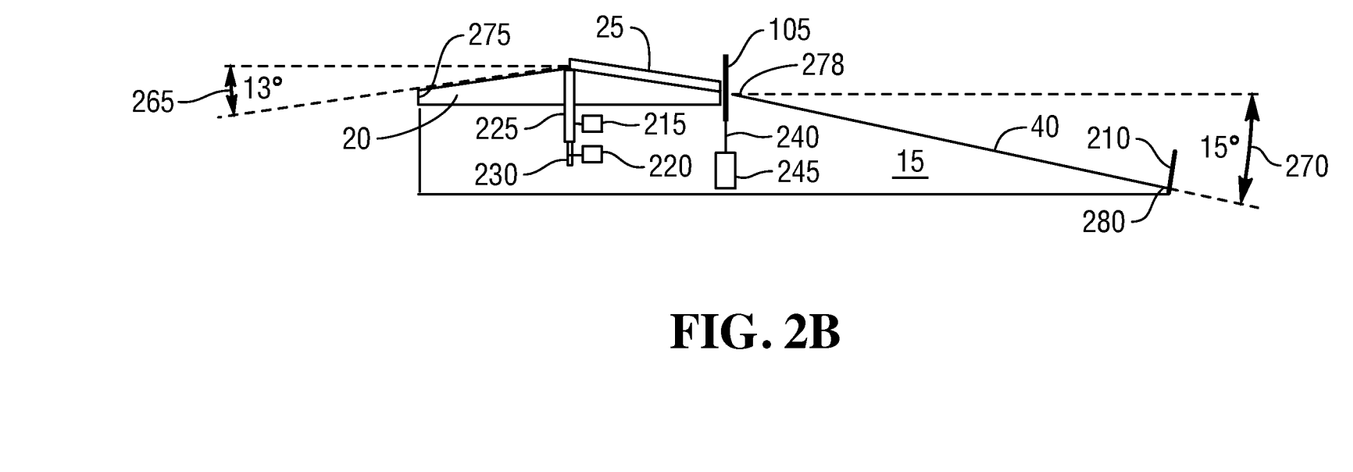
FIG. 2B is a second high-level cross section drawing further illustrating another portion of the item distribution apparatus depicted in FIG. 1.

Turning to FIG. 2B, there is provided a high-level cross section drawing illustrating another portion of the item distribution apparatus 15. The depicted individual collection area 40 has an outer edge 280 and an inner edge 278. The surface of the collection area 40 is sloped at an angle of approximately 15 degrees 270 as measured from a horizontal datum line. The other two individual collection areas 35, 45 that are not depicted have the same features. The distribution area 20 has a surface that is sloped at approximately 13 degrees 265. The angle of both the distribution area 20 and the three individual collection areas 35, 40, 45 are designed to allow items to slide to their intended destinations. The distribution area 20 has a slightly lower slope angle than the collection areas 35, 40, 45 because the distribution area 20 rotates and the centrifugal forces resulting from the rotation aids in moving the items.

Now with reference to FIG. 3, there is provided a high-level block diagram illustrating selected computer hardware and software components of the high-velocity scanned item distribution system 10. The item distribution apparatus 15 includes a computer 300, an item fence controller 345, a diverter arm controller 350, a rotating distribution disk controller 355, a divider controller 360, a lighting controller 365 and a sensor input controller 370. The computer 300 includes a processor 305, control circuitry 310, a memory 330, a communications controller 315 and a peripheral controller 340.

The control circuitry 310 includes different components that allow the processor 305 to communicate with the memory 330 to read and write to the contents of the memory 330 and to communicate with the communications controller 315 and to communicate with the peripheral controller 340.

The memory 330 uses non-transitory storage devices including both volatile and non-volatile memory. The non-volatile memory may suitably include flash memory, other types of solid state electronic memory and rotating storage devices, such as disk drives or the like. Non-volatile memory retains stored information after power is removed from the memory and until power is restored. Computer instructions 335 stored in the memory 330 are executed by the processor 305 and cause the processor 305 to control the devices, controllers and peripherals attached to the item distribution apparatus 15 and to perform the functions of the item distribution apparatus 15.

The communications controller 315 communicates with a point of sale computer 325 over a network 320. The communications controller 315 sends and receives data across the network 320 to the point of sale computer 325. The point of sale computer 325 sends information on each item that is being transferred to the item distribution apparatus 15 using the network 320. The processor 305 sends status information to the point of sale computer 325 about the operation of the item distribution apparatus 15. For example, when all the individual collection areas 17 are in use, the processor 305 will send a status that indicates the individual collection areas 17 are in use which causes the point of sale computer 325 to suspend work on any new purchase transactions until space is available on the item distribution apparatus 15. When one of the individual collection areas 35, 40, 45 becomes available, the processor 305 sends another status indicating that the point of sale computer 325 can begin processing a new purchase transaction. In another example, the processor 305 sends messages to the point of sale computer 325 indicating that one of the three individual collection areas 35, 40, 45 is full of items and to stop transferring items until space is available. The processor 305 will send another message when space is available.

The peripheral controller 340 communicates with the item fence controller 345, the diverter arm controller 350, the rotating distribution disk controller 355, the divider controller 360, the lighting controller 365 and the sensor controller 370, each controlling one or more components of the item distribution apparatus 15.

The item fence controller 345 controls the actuators used to control each of the three item fences 100, 105, 110. The item fence controller 345 causes each of the item fences 100, 105, 110 to independently move between a raised position and a lowered position when directed to do so by the processor 305.

The diverter arm controller 350 controls the first motor 220. The diverter arm controller 350 causes the first motor 220 to move the diverter arm 25 to a desired position when commanded to do so by the processor 305. The diverter arm 25 can be moved in either a clockwise or counterclockwise direction.

The rotating distribution area controller 355 controls the second motor 215 which causes the distribution area 20 to rotate at a predetermined speed. The rotating distribution area controller 355 can cause the distribution area 20 to start and stop rotation, to increase or decrease the speed of rotation and to perform a jitter motion that causes the distribution area 20 oscillate rapidly between two different speeds causing a mechanical vibration in the distribution area 20. The jitter motion is used to help break the force of static friction between an item resting on the distribution area 20 and the distribution area 20 causing the item to start sliding. Once the static force of friction is overcome by the jitter motion, the normal centrifugal forces generated by the rotation of the distribution area 20 will overcome the smaller dynamic force of friction and cause the item to slide off the distribution area 20. In some embodiments, a short jitter motion is timed to cause an item to slide off the distribution area 20 into the proper collection area 35, 40, 45 without the need for the diverter arm 25 to contact the item. Not using the diverter arm 25 reduces the possibility of damaging the item.

In some embodiments, the two divider arms 55, 60 are movable. In embodiments that have powered movable divider arms 55, 60, the divider controller 360 controls the location of the two divider arms 55, 60. The divider arm controller 360 controls devices that independently move each divider arm 55, 60 to different locations around the collection area 17. The divider arm controller 360 is not used on embodiments where the divider arms 55, 60 are fixed or moved manually.

In embodiments where the divider arms 50, 55, 60, 65 include the extendable element, the divider controller 360 also controls the extension and retraction of the extendable elements within each of the divider arms 50, 55, 60, 65. In some embodiments, linear actuators are used to extend and retract each of the extendable elements. The processor 305 independently controls moving each extendable element to either it retracted or extended positions.

The lighting controller 365 controls the lights used on the item distribution apparatus 15. The controlled lights include LED lights that provide status indications and that generate colored lights used to identify each of the three collection areas 35, 40, 45. The lighting controller 365 can cause lights to flash, dim or turn off or on.

The sensor input controller 370 controls sensors used to track or detect the presence or location of items being distributed by the item distribution apparatus 15. In some embodiments, the controlled sensors include a camera that is mounted above the item distribution apparatus 15 and captures images of the top surfaces of the item distribution apparatus 15. The images are processed, preferably by the processor 305, to determine the presence and location of one or more items being distributed. In some embodiments, the controlled sensors include optical sensors located in different areas of the item distribution apparatus 15 and they detect when items pass by as they are being distributed and when items are present in or absent from different areas of the item distribution apparatus 15.

Figure 4A:
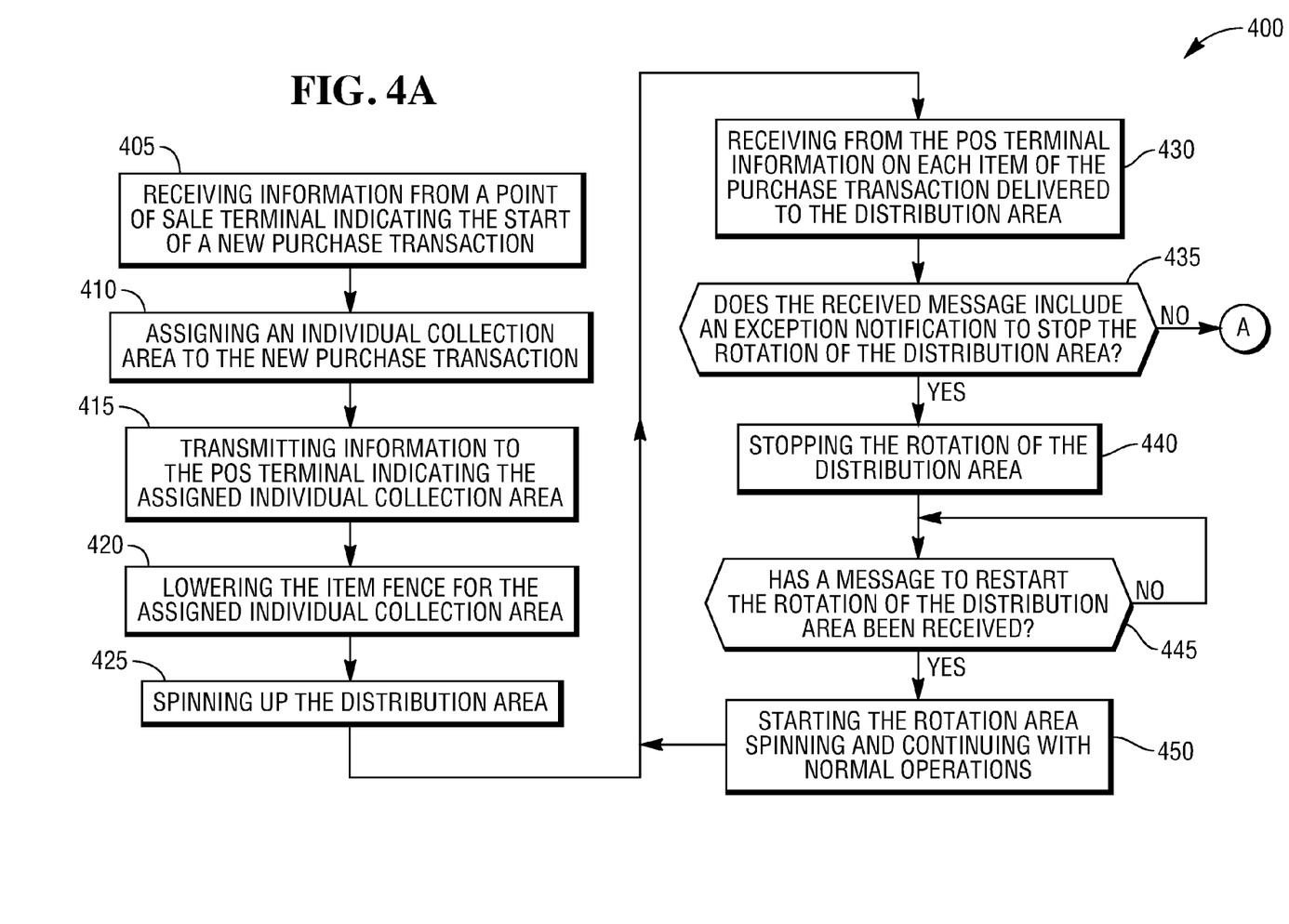
FIGS. 4A and 4B form a high-level flow diagram illustrating a method of operating the high-velocity scanned item distribution apparatus.
Figure 4B:
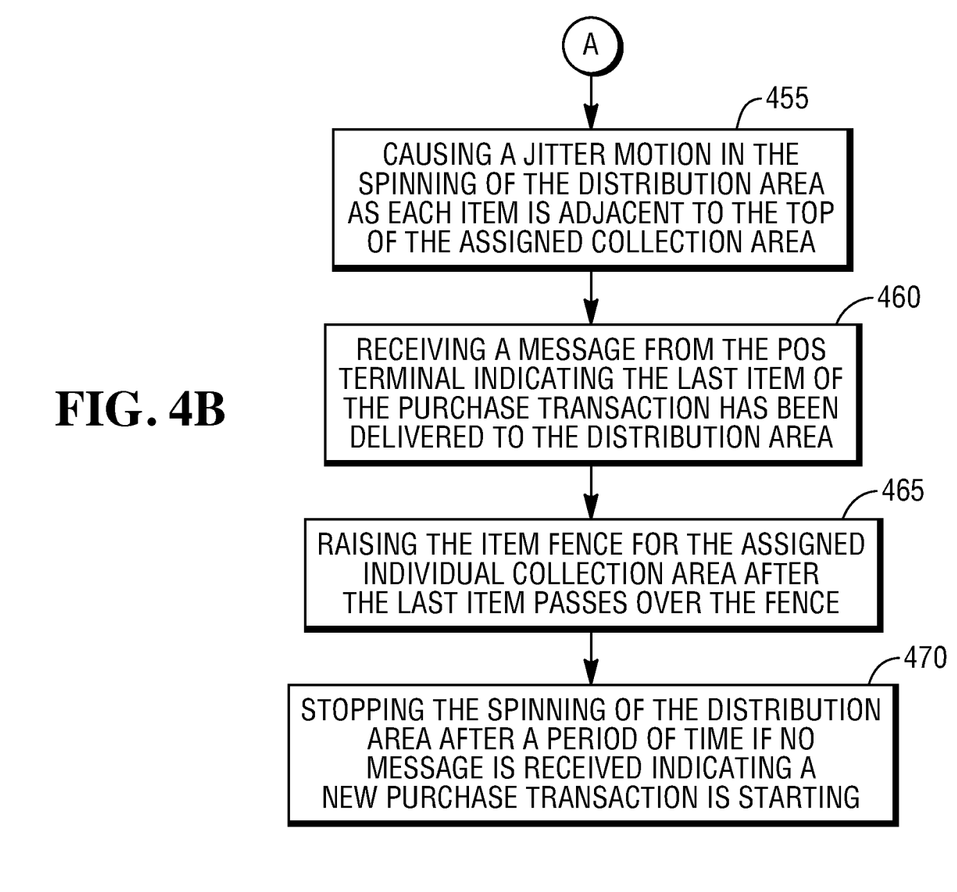

Turning now to FIG. 4, there is provided a high-level flow diagram 400 illustrating a method of operating the high-velocity scanned item distribution apparatus 15. The item distribution apparatus 15 receives items that are scanned by the high-velocity POS terminal 85 as part of a purchase transaction and then distributes the received items to one of the three individual collection areas 35, 40, 45. The high-velocity POS terminal 85 can scan items for purchase faster than the items can be bagged if the scanning and bagging processes are performed as serial processes. Performing these processes in series, that is scan, bag, scan, bag, . . . , slows down the checkout process and reduces the productivity of the high-velocity POS terminal 85.

This problem is solved by adding the high-velocity scanned item distribution apparatus 15 to the high-velocity POS terminal 85. Adding the item distribution apparatus 15 reduces the time required to complete each purchase transaction because items for up to three purchase transactions can be simultaneously placed on the item distribution apparatus 15 for bagging. While the item scanning process is still a serial process, the bagging function has been converted to a parallel process where items for multiple purchase transactions can be bagged in parallel. This allows the item scanning and payment process at the POS terminal 85 to continue until all three collection areas 35, 40, 45 of the item distribution apparatus 15 are in use. This optimizes the performance of the POS terminal 85.

In step 405, the item distribution apparatus 15 receives information from the POS terminal 85. The information indicates that the POS terminal 85 has started to scan an item for a new purchase transaction and that the item distribution apparatus 15 should prepare to receive items for the new purchase transaction.

In step 410, the item distribution apparatus 15 identifies one of the three individual collection areas 35, 40, 45 that is not in use and assigns it to receive items that will be received from the POS terminal 85 for the new purchase transaction. The item distribution apparatus 15 maintains a status for each of the three individual collection areas 35, 40, 45 that includes an indication of whether or not items from a previous purchase transaction are still present. The item distribution apparatus 15 uses sensors to determine if any items are present in a collection area from a previous purchase transaction. A collection area is shown as busy as long as one item is present in the collection area.

In some embodiments, the item distribution apparatus 15 processes images of the individual collection areas 35, 40, 45 to determine if any items are still present in a collection area. The images are captured by the cameras located above the item distribution apparatus 15 and processed by the processor 305. In other embodiments, optical sensors are located within each of the three collection areas 35, 40, 45 and detect the presence of one or more items in each collection area. In still other embodiments, an operator signals when a collection area is available for use.

In step 415, the item distribution apparatus 15 transmits information to the POS terminal 85 that indicates which of the three individual collection areas 35, 40, 45 has been assigned to collect the items for the new purchase transaction. The POS terminal 85 will provide this information to the customer so the customer knows which collection area will have their purchased items. Each of the three individual collection areas 35, 40, 45 is labeled to aid the customer in identifying the correct collection area. In some embodiments, each of the three individual collection areas 35, 40, 45 are color coded and use colored lights to help customers identify the correct collection area.

In some embodiments, the collection areas 35, 40, 45 are assigned the letter designations "A", "B" and "C" respectively. In addition, each collection area may suitably display or include a color. For example, lights around collection area "A" may produce a green light that causes the collection area to have a green color. Lights around collection area "B" may produce a blue light that causes the collection area to have a blue color. Lights around collection area "C" may produce a red light that causes the collection area to have a red color. In these embodiments, the customer may suitably be directed to collection area: "A" with the green lights or "B" with the blue lights or "C" with the red lights.

In step 420, the item distribution apparatus 15 lowers the item fence for the assigned individual collection area while raising the item fences for the other two individual collection areas. Each of the three individual collection areas 35, 40, 45 has one of the item fences 100, 105, 110 located along the inner edge of the individual collection area between the individual collection area and the distribution area 20. Each of three item fences 100, 105, 110 can be individually raised above the surface of the individual collection area and the distribution area 20 so that items rotating on the distribution area 20 cannot exit the distribution area 20. Each of the three item fences 100, 105, 110 can be individually lowered so that the top of the item fence is level with the surface of the individual collection area thus allowing an item to slide off the distribution area 20 onto the individual collection area.

In embodiments that include extendable elements, the item distribution apparatus 15 causes the extendable element of the second divider arm for the assigned individual collection area to move to the extended position. All other extendable elements are in the retracted position. The extendable element, in the extended position, acts to sweep items from the distribution area 20 across the lowered item fence and into the assigned individual collection area. Each individual collection area is formed by two divider arms. As items rotate on the distribution area 20, the divider arm reached first by item is named the first divider arm for that individual collection area. The divider arm reached after the first divider arm is named the second divider arm for that individual collection area. For example, divider arm 60 is the first divider arm for individual collection area 40 and divider arm 55 is the second divider arm for individual collection area 40. If the distribution area 20 is rotating counterclockwise and individual collection area 40 is the assigned individual collection area, item fence 105 will be lowered and the extendable element in the divider arm 55 will be in the extended position. This will cause items on the distribution area 20 to slide into the individual collection area 40. Prior to raising the item fence, the item distribution apparatus 15 retracts the extendable element.

In step 425, the item distribution apparatus 15 causes the distribution area 20 to rotate or spin at a predetermined speed if it is not already rotating. In some embodiments, the rotation of the distribution area 20 is stopped when not in use to reduce energy cost and noise.

In step 430, the item distribution apparatus 15 receives information from the POS terminal 85 about each item in the purchase transaction. The POS terminal 85 sends separate information on each item as the item is scanned or passes by the optical code scanner and is transferred to the item distribution apparatus 15. The information identifies the item and may suitably include a description for the type of item scanned. In some embodiments, the item distribution apparatus 15 may suitably use the information to direct items of a similar type to predefined areas within each individual collection area. For example, non-fragile items are directed to the left side of each of the three individual collection areas 35, 40, 45 while fragile items are directed to the right side. The received information may suitably include an exception notification that instructs the item distribution apparatus 15 to stop the rotation of the distribution area 20.

It is possible that during the normal item scanning process an item is not identified by the optical code scanner 80. When this occurs, the conveyor belt 75 on the POS terminal 85 continues to move the unidentified item along with any other items that have been identified to the distribution area 20. The conveyor belt 75 is not stopped because it would reduce the productivity of the POS terminal 85 by stopping the scanning process. Therefore, the conveyor belt 75 continues to move items to the distribution area 20 but the unidentified item must still be retrieved for identification.

The POS terminal 85 sends an exception notification to the item distribution apparatus 15 with a status that indicates "No Barcode Read". When the item distribution apparatus 15 identifies this status, it stops the rotation of the distribution area 20 causing the unidentified item to remain on the distribution area 20 allowing the operator to retrieve the item for identification. Once the operator has retrieved the unidentified item, the operator causes the POS terminal 85 to send another message to the item distribution apparatus 15 with a status that indicates the distribution area 20 should returned to normal rotating operation. The item distribution apparatus 15, in response to the new status, starts rotating the distribution area 20 and returns to normal operation. The operator identifies the unidentified item to the POS terminal 85 and place the now identified item on the conveyor belt 75 for delivery to the distribution area 20.

In step 435, the item distribution apparatus 15 determines if the received message includes an exception notification to stop the rotation of the distribution area 20. If the exception notification is found, control passes to step 440, otherwise control passes to section A located in FIG. 4B.

In step 440, the item distribution apparatus 15, stops the rotation of the distribution area 20. While the distribution area 20 is stopped, items delivered to the distribution area 20 by the POS terminal 85 will remain generally in the area where they are delivered by the conveyor belt 75.

In step 445, the item distribution apparatus 15 determines if a new message has been received from the POS terminal 85 indicating that the normal operations should continue and the distribution area 20 should be rotating again. If the message to restart normal operations is received, control passes to step 450, otherwise control loops back to step 445.

In step 450, the rotation of the distribution area 20 is restarted and normal item distribution continues.

In step 455, the item distribution apparatus 15 causes a jitter motion in the spinning distribution area 20 when an item is adjacent to the top of the assigned individual collection area. In most cases, the speed of rotation of the distribution area 20 will cause an item to move toward the edge of the distribution area 20 until it contacts one of the item fences 100, 105, 110. Once the item is rotated to a location where one of the three item fences 100, 105, 110 is in the lowered position, the item slides off the distribution area 20 into the assigned individual collection area.

However, some types of items do not slide as easy as others. When these items are identified, the item distribution apparatus 15 causes the speed of the distribution area 20 to experience small but rapid variations in speed. This jitter motion causes the distribution area 20 to vibrate slightly which along with the speed of rotation provides sufficient force to overcome the static force of friction between the item and the surface of the distribution area 20 causing the item to slide to the outer edge of the distribution area 20. If the item fence in this area is lowered, the item will slide off the distribution area 20 and into one of the three individual collection areas 35, 40, 45. The item distribution apparatus 15 does not use the jitter motion to move all items. In most cases, the rotation speed provides a sufficient force to move the items. However, if an item makes a full revolution of the distribution area 20, the item distribution apparatus 15 may suitably use the jitter motion to cause the item to exit the distribution area 20. If the first jitter motion fails to move the item, the amplitude of the jitter motion is increased on each revolution until the item slides off the distribution area 20. If the item fails to slide off the distribution area 20 after a predetermined number of rotations, the processor 305 sends a message to the POS terminal 85 requesting assistance from an operator to remove the item.

In step 460, the item distribution apparatus 15 receives a message from the POS terminal 85 indicating that the last item of the current purchase transaction has been delivered to the distribution area 20. At this point, the POS terminal 85 completes the purchase transaction by receiving payment from the customer. The item distribution apparatus 15 delivers the last item to the assigned individual collection area.

In step 465, the item distribution apparatus 15, raises the item fence for the assigned individual collection area after the last item passes over the item fence. Raising the item fence prevents any additional items from entering the assigned individual collection area until the items have been removed and the individual collection area is ready to be used to receive items from another purchase transaction.

In step 470, the item distribution apparatus 15 will stop the spinning or rotation of the distribution area 20 after a predetermined period of time if no message is received from the POS terminal 85 indicating that a new purchase transaction is starting. Spinning down the distribution area 20 saves power and reduces noise. The predetermined period of time can be adjusted by system administrators and the stop rotation feature can be turned off so that the distribution area 20 always rotates.

Although the present invention has been described with particular reference to certain preferred embodiments thereof, variations and modifications of the present invention can be effected within the spirit and scope of the following claims. For example, it is envisioned that embodiments of the present invention would have a collection area divided into a different number of individual collection areas. Embodiments could have two, four or more individual collections areas. In still other embodiments, the item distribution apparatus 15 is replicated two or more times and a conveyor belts delivers items from the POS terminal 85 to each of the item distribution apparatus 15.

What is claimed is:

1. A high-velocity scanned item distribution apparatus that receives items scanned by a point of sale terminal and distributes them to multiple collection areas, the apparatus comprising:
    a distribution area with a shape of a disk rotatably mounted in a center of the apparatus forming a top surface of the apparatus;
    a transition component angled to prevent the items from falling off a top of a conveyor housing;
    a collection area fixably mounted to the apparatus extending circularly outward from an edge of the distribution area for approximately three fourths of a circumference of the distribution area and forming a top outer surface of the apparatus;
    a plurality of area divider arms mounted to the collection area, the plurality of divider arms extend radially between the inner and outer edges of the collection area and divide the collection area into a plurality of individual collection areas;
    a plurality of extendable item fences where one of the plurality of arc shaped extendable item fences is located between the inner edge of each of a plurality of individual collection areas, including the collection area, and the outer edge of the distribution area; and
    wherein the distribution area is configured to receive an item from a point of sale terminal along with characteristic information for the item indicating whether the item is heavy, light, fragile, or non-fragile, and rotatably move the item to a location above a first of the plurality of individual collection areas, and wherein the plurality of individual collection areas include at least three individual collection areas, and wherein the item will exit the distribution area sliding on to the first of the plurality of individual collection areas when a first of the plurality of arc shaped extendable item fences located proximate to the inner edge of the first of the plurality of individual collection areas is in a lowered position, and wherein one of the plurality of area divider arms associated with the first of the plurality of individual collection areas is configured to be positioned to one of two sides of the first of the plurality of individual collection areas based on that item's characteristic information to direct that item to into a particular one of two sides within the first of the plurality of individual collections areas which the item is being directed.

2. The apparatus of claim 1, further including a motor coupled to the distribution area and adapted to rotate the distribution area.

3. The apparatus of claim 2, further including a motor controller in communication with the motor coupled to the distribution area and adapted to cause the motor to rotate the distribution area and to cause the motor to transmit a short jitter motion to the distribution area at a predetermined time.

4. The apparatus of claim 1, wherein the top surface of the distribution area is a cone shaped circular disk located in the top center of the apparatus where the outer edge of the disk is lower than the center of the disk.

5. The apparatus of claim 4, wherein the slope of the cone shaped circular disk, measured from the horizontal is substantially 13 degrees.

6. The apparatus of claim 1, wherein at least one of the plurality of area divider arms is movably mounted to the collection area and configured to move clockwise and counterclockwise increasing the area of one of the plurality of individual collection areas while decreasing the area of another one of the plurality of individual collection areas.

7. The apparatus of claim 1, further comprising:
a plurality of bagging stations where at least one of the plurality of bagging stations is located proximate to each of the plurality of individual collection areas and where each of the plurality of bagging stations is configured to support bags where items taken from the proximal individual collection area are placed.

8. The apparatus of claim 1, further comprising:
a plurality of item location sensors configured to determine the location of items located on the item distribution apparatus.

9. The apparatus of claim 1, further comprising:
a diverter arm extending from the center of the distribution area to the outer edge of the distribution area rotatably mounted to the center of the apparatus independent of the distribution area.

10. The apparatus of claim 1, wherein the area divider arms include an extendable element configured to move between an extended position and a retracted position where each extendable element retracts into one of the area divider arms and when in the extended position the extendable element extends to substantially the center of the distribution area.

11. A method implemented by a computer processor controlling an item distribution apparatus, the item distribution apparatus receives scanned items from a point of sale terminal that comprise a purchase transaction, the method comprising:

receiving information from the point of sale terminal wherein the information indicates the start of the purchase transaction;

assigning a first individual collection area from a plurality of individual collection areas to receive items for the purchase transaction after determining no items are present in the first individual collection area, and wherein the plurality of individual collection areas include at least three individual collection areas;

lowering to a lowered position a first item fence from a plurality of item fences wherein the first item fence when in the lowered position only allows items to enter the first individual collection area;

causing a distribution area spin up to a predetermined rotating speed;

ensuring each item does not fall while on a surface of the distribution area through an angled transition component;

receiving information from the point of sale terminal about each item of the purchase transaction received by the distribution area from the point of sale terminal and receiving with the information and for each item, item characteristic information indicating whether that item is heavy, light, fragile, or non-fragile;

receiving information from the point of sale terminal wherein the information indicates a last item of the purchase transaction has been received by the distribution area;

raising the first item fence to a raised position after determining the last item has been delivered to the first individual collection area; and positioning a divider arm of the first individual collection area to divert a current item being received in the first individual collection area to one of two sides of the first individual collection area based on that item's characteristic information, wherein the divider arm of the first individual collection area separates the current item to one of the two sides within the first individual collection area.

12. The method of claim 11, wherein causing a distribution area to spin up further comprises wherein the centrifugal force caused by the rotation of the distribution area causes items placed on the distribution area to slide to the outer edge of the distribution area where the items either contact one of the plurality of item fences or exits the distribution area into one of the plurality of individual collection areas assigned to receive the items.

13. The method of claim 12, further comprising:
causing a jitter motion in the rotation of the distribution area wherein the jitter motion causes the distribution area to vibrate wherein the forces from the vibration along with the centrifugal force cause the items to slide to the outer edge of the distribution area.

14. The method of claim 11, further comprising:
transmitting information to the point of sale terminal identifying the assigned individual collection area.

15. The method of claim 11, further comprising:
stopping the rotation of the distribution area after a predetermined period of time if no information is received indicating the start of a new purchase transaction.

16. The method of claim 11, wherein determining no items are present in the first individual collection area further comprises processing an image of the first individual collection area received from a camera to determine no items are present wherein the camera is located above the high-velocity scanned item distribution apparatus.

17. The method of claim 16, wherein determining the last item has been delivered to the first individual collection area further comprises receiving processing an image from the camera of the first individual collection area to determine the last item has been delivered to the first individual collection area.

18. The method of claim 11, wherein determining no items are present in the first individual collection area and determining the last item has been delivered to the first individual collection area further comprise using item detection sensors located in the high-velocity scanned item distribution apparatus.

19. One or more non-transitory digital storage media storing instructions which, when executed by one or more computing devices, cause performance of the method recited in claim 11.

\* \* \* \* \*